United States Patent [19]
Schmidt

[11] Patent Number: 4,706,514
[45] Date of Patent: Nov. 17, 1987

[54] GEAR SELECTOR FOR MANUAL TRANSMISSION HAVING REVERSE GEAR LOCKOUT

[75] Inventor: Vinzenz Schmidt, Pulheim, Fed. Rep. of Germany

[73] Assignee: Ford Motor Company, Dearborn, Mich.

[21] Appl. No.: 930,635

[22] Filed: Nov. 14, 1986

[30] Foreign Application Priority Data

Dec. 4, 1985 [DE] Fed. Rep. of Germany ....... 3542812

[51] Int. Cl.$^4$ .......................... G05G 5/02; G05G 9/12
[52] U.S. Cl. ........................................ 74/476; 74/526
[58] Field of Search .................................. 74/476, 526

[56] References Cited

U.S. PATENT DOCUMENTS

| | | | |
|---|---|---|---|
| 1,241,415 | 9/1917 | Masury et al. | 74/473 R |
| 2,193,733 | 3/1940 | Maier | 74/334 |
| 2,245,714 | 6/1941 | Price et al. | 74/473 R |
| 2,839,945 | 6/1958 | Zion | 74/473 R |
| 3,473,403 | 10/1969 | Biro | 74/473 R |
| 3,646,828 | 3/1972 | Milton et al. | 74/484 |
| 3,962,930 | 6/1976 | Frazee | 74/473 R |
| 4,028,959 | 6/1977 | Long | 74/473 R |
| 4,060,157 | 11/1977 | Hillstrom | 192/4 A |
| 4,068,540 | 1/1978 | Beckerman | 74/476 |
| 4,193,316 | 3/1980 | Kelbel | 74/477 |
| 4,297,910 | 11/1981 | Myers | 74/473 R |
| 4,633,728 | 1/1987 | May | 74/476 |

FOREIGN PATENT DOCUMENTS

| | | |
|---|---|---|
| 2062961 | 12/1970 | Fed. Rep. of Germany. |
| 1911206 | 9/1972 | Fed. Rep. of Germany. |
| 3003079 | 11/1980 | Fed. Rep. of Germany. |
| 3016909 | 12/1981 | Fed. Rep. of Germany. |

*Primary Examiner*—Allan D. Herrmann
*Attorney, Agent, or Firm*—Frank G. McKenzie; Donald J. Harrington

[57] ABSTRACT

The gear shift mechanism according to this invention includes a selector shaft, rotatable by means of a shift lever for selecting various gear shift channels and axially displaceable for engaging the selected gear. The selector shaft carries a shift finger for engagement with the selector forks in the respective gear shift channels and a selector finger, which engages the slots of an internal shift gate to constrain the movement of the selector shaft. To prevent inadvertent engagement of the reverse gear, a pawl is rotatably mounted on the selector finger and is held by a spring biased detent in one of two stable angular positions, which are aligned with and perpendicular to the direction of the gear shift channels. A stop and at least one control pin are provided on the gate plate to cooperate with the pawl. The control pin changes the angular position of the pawl during gear selection movement of the selector finger relative to the gate plate and the stop prevents engagement of reverse gear when the pawl is aligned with the gear shift channels.

6 Claims, 6 Drawing Figures

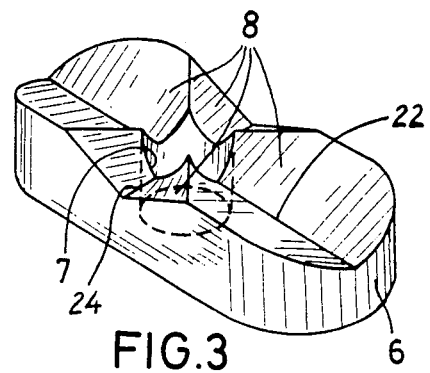
FIG.3
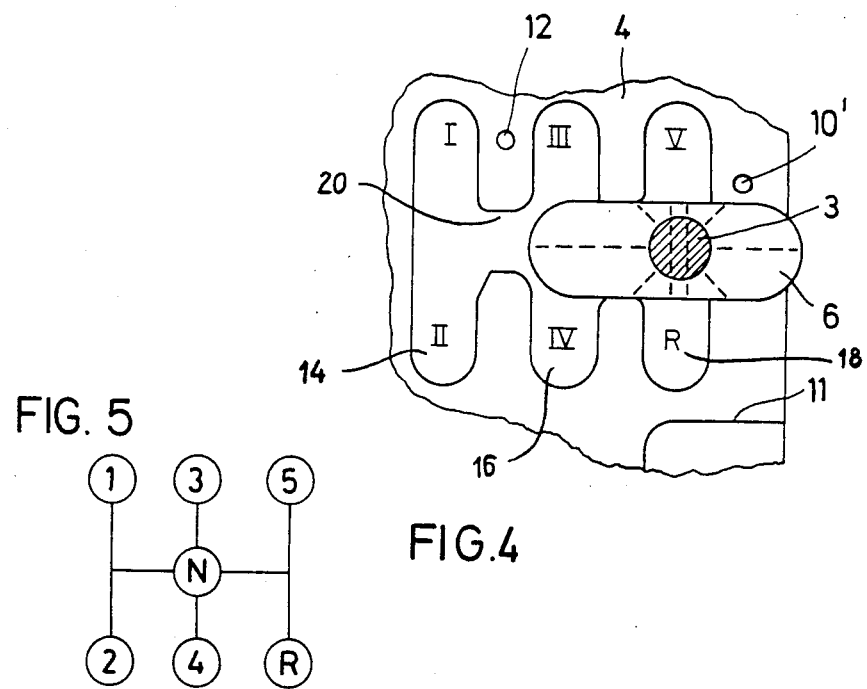
FIG. 5
FIG.4

GEAR SELECTOR FOR MANUAL TRANSMISSION HAVING REVERSE GEAR LOCKOUT

BACKGROUND OF THE INVENTION

1. Field of the Invention

This invention relates to the field of gear shift mechanisms for a manual automotive transmission and, more particularly, pertains to such mechanisms for preventing inadvertent engagement of the reverse gear.

2. Description of the Prior Art

German patent application DE-OS No. 19 11 206 describes a gear selector mechanism in common use in automotive vehicles. The gear selector lever is required to be raised or depressed against the force of a spring in order to Permit engagement of the reverse gear. However, because the gear selector lever in a five speed transmission is moved to the same shift channel when selecting the fifth forward speed ratio as when selecting the reverse gear, it has been found that a spring-loaded gear shift lock of the type described in that patent application is not entirely satisfactorily.

A gear shift mechanism that provides a reverse gear lock in a multiple speed transmission in which the fifth forward gear position lies in the same gear shift channel as the reverse gear position is described in German patent application DE-0S No. 30 03 079. There a rotatable locking cam, which is rotated in the vicinity of the shift lever support or in the gearbox extension near the end of the selector shaft, cooperates with a component of the shift lever or shift shaft to prevent direct engagement of the reverse gear while changing the position of the selector shaft from the forward gear position.

Gear shift reverse locking mechanisms known from the prior art have the disadvantage that troublesome dimensional tolerances can accumulate and affect adversely the cooperative relationship among the locking cams, latches, shift levers and the selector shaft.

German patent DE-OS No. 30 16 909 describes another gear shift locking mechanism for the reverse gear ratio in which a locking disc, located on the end of the selector shaft adjacent a shift finger, cooperates with the spring-loaded locking pin located in the transmission casing. The gear shift lock mechanism avoids a portion of the dimensional tolerance accumulation, but another portion is inherent in the design because certain parts of the mechanism are mounted on the selector shaft and other components are located in the casing.

According to the present invention, there is provided a gear shift mechanism that includes a lock or latch for preventing inadvertent engagement of the reverse gear for use in a manual transmission having multiple forward speed ratios. The mechanism includes a selector shaft, which is rotatable by means of a gear selector lever for selecting various gear shift channels and is axially displaceable by the gear selector lever for producing engagement of the selected gear ratio. The selector shaft carries a shift finger, engageable with shift forks in the respective gear shift channels, and an additional finger, which moves within a system of intersecting slots formed in a gate plate that defines the range of movement of the selector shaft. A pawl is rotatably mounted on the additional finger and is held by a spring-biased detent in one of two stable angular positions, one position aligned with, and the other perpendicular to, the gear shift slots or channels on the lock plate. A stop and at least one control pin are located on the gate plate to cooperate with the pawl. The control pin changes the angular position of the pawl relative to the gear shifting channels as the additional finger is moved by the vehicle operator relative to the gate plate while selecting the various gear ratios. The stop prevents engagement of the reverse gear when the pawl is turned by contact with a control pin to one of its stable angular positions.

The gear shift mechanism according to this invention is easy to assemble, operates reliably and requires components that can be manufactured easily and at low cost.

BRIEF DESCRIPTION OF THE DRAWINGS

The invention will now be described by way of example with reference to the accompanying drawings in which:

FIG. 3 is a perspective view of the locking pawl, and

FIG. 4 is a cross section similar to FIG. 2 showing an additional embodiment of the invention.

FIGS. 5 and 6 show the gear ratio positions through which the gear selector is moved and their correspondence to the slots of FIGS. 2 and 4, respectively.

DESCRIPTION OF THE PREFERRED EMBODIMENT

Figure 1:
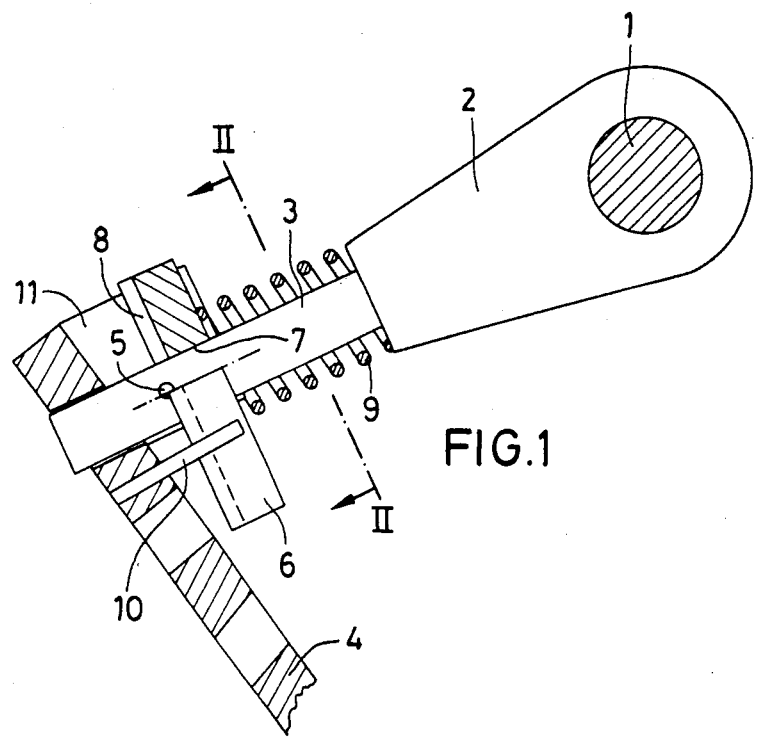
FIG. 1 is an axial view, partially in cross section, taken in the direction of the axis of the selector shaft of the gear shift mechanism according to this invention.

The construction of the selector shaft, its shift finger and its relationship to the selector forks and shift lever are of the type illustrated in FIG. 3 of German Patent No. 30 03 079, the entire disclosure of which is herein incorporated by reference.

In the drawings, a selector pin 3 is shown mounted on a selector shaft 1 by an arm 2, which is fixed to the selector shaft. The selector finger 3 fits within slots formed in a gate plate 4, which defines a one-two gear shift channel 14 between the first and second gear ratio positions, a three-four channel 16 between the third and fourth gear ratio positions, and a five-reverse channel 18 between the fifth gear ratio and the reverse drive position.

Shaft 1 carries a shift finger (not shown) extending radially from the axis of the shaft. This finger is rotated into alignment alternately with shift forks that slide parallel to shaft 1 to move the sleeves of synchronizer clutches into engagement with selected gear wheels. As shaft 1 rotates, the shift fork corresponding to the selected gear ratio is engaged by the shift finger. As the shaft slides axially, the selected fork moves the synchronizer into engagement with the selected gear wheel.

The gate plate 4, which is located within the transmission casing, is secured in a suitable manner relative to the selector shaft 1 in the transmission casing after the channels have been correctly aligned with respect to selector finger 3.

As FIG. 1 shows, a pin 5 is fitted in a hole directed through a diameter of finger 3 and is aligned generally with the axis of the selector shaft 1. A locking pawl 6 is biased by a spring 9 acting between arm 2 and the upper surface of the pawl. The pawl has a central hole 7 through which the selector finger extends so that the pawl can rotate with respect to the selector finger. FIG. 3 shows that the pawl is formed on the side that faces pin 5 with intersecting grooves 22, 24 defined by inclined surfaces 8, which are contacted by pin 5 as the pawl rotates relative to the selector finger. Pin 5 is held by a spring 9 in contact with the inclined surfaces as the pawl turns on finger 3 from its usual, stable, seated position within the grooves.

The intersecting grooves 22, 24 defined by surfaces 8 and pin 5 together form a biased detent, which holds pawl 6 in either of the two angular positions with respect to the axis of pin 5 defined by the grooves. These angular positions are respectively parallel to and transverse to gear shift slots 14, 16 and 18. The slots of gate plate 4 include a neutral slot 20, which is perpendicular to the gear shift slots. When the selector finger is located in the neutral slot, locking pawl 6 can be positioned both transversely and longitudinally with respect to the gear shift slots.

The control pin 10 extends above the surface of the gate plate 4 on the web between slots 16 and 18 and on the side of the neutral slot that is closest to the forward speed ratio position. A stop 11 extends outward from the surface of plate 4 adjacent the end of slot 18 near the reverse gear position. Stop 11 is formed so that the pawl contacts the stop when selector finger 3 is moved toward the reverse gear position, provided pawl 6 is turned parallel to slot 18.

Figure 2:
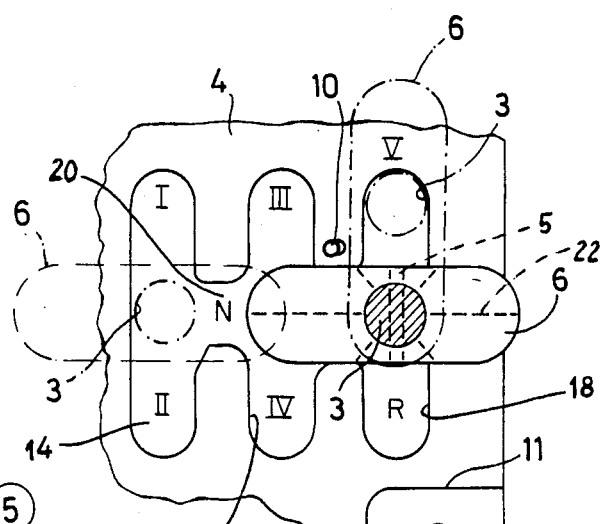
FIG. 2 is a cross section taken at the plane II—II of FIG. 1.
Figure 6:
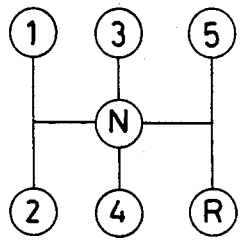

As may be seen from FIG. 2, when selector finger 3 is in the neutral position within the 1-2 gear shift slot 14, as indicated by the dot-dash line, locking pawl 6 is directed transversely to the gear shift slots. If the selector finger is moved along neutral slot 20 into the 5-R slot 18, the pawl maintains its former position on the selector finger.

If the fifth gear ratio is selected and selector finger 3 is moved to the position at the top end of slot 18, pawl 6 is rotated counterclockwise on the selector finger due to its contact with pin 10. Then pin 5 becomes seated in the groove 22 on the underside of the pawl, which becomes aligned with slot 18 as indicated by dash-dot lines shown at the top of FIG. 2. Therefore, the selector finger is moved down from the fifth gear position in slot 18, the end of the locking pawl strikes stop 11 on the gate plate and prevents engagement of the reverse gear.

Whenever a downshift is made from the fifth gear position to the third gear position or fourth gear position, the pawl is rotated clockwise on the selector finger due to its contact with pin 10. When the selector finger is moved from the neutral plane in slot 18 to the neutral plane in slot 16, the driver senses the increased effort required to move the selector finger into the 3-4 slot due to the spring force that develops as surfaces 8 on the pawl move relative to pin 5. The extra shifting force is a desirable feature when shifting down from the fifth gear ratio into lower gear ratios.

However, to select reverse gear, the selector finger is moved parallel to the neutral plane 20 from slot 14 to slot 18, and the pawl is positioned as shown in solid lines in FIG. 2. Then, the selector finger is moved downward within slot 18 to the reverse drive position without obstruction and without increasing the effort required to shift from the neutral plane to the reverse drive position.

FIG. 4 shows a second arrangement of the invention in which a second control pin 12 extends upward from the surface of plate 4 and is located in the web between slots 14 and 16 on the side of the neutral plane that is closest to the first and third gear ratio positions. A control pin 10' is located adjacent slot 18 above the neutral plane. In this arrangement, movement of the selector finger downward from the fifth gear position and from the third gear position directly into the reverse gear position is prevented because the pawl becomes aligned with slots 18, 16 and 14 when it is moved to the third and fifth gear ratio positions. Therefore, the lower end of the pawl contacts stop 11 and prevents engagement of reverse gear. However, when the selector finger is moved from the 1-2 slot 14 rightward to the 5-R slot 18, the presence of pin 12 assures that the pawl is positioned perpendicular to slot 16 so that selector finger 3 can be moved from the neutral plane 20 downward to the reverse gear position. Therefore, the gear selector mechanism can be moved readily from the neutral plane to the reverse gear position without having to overcome an increased shift force effect of the biasing spring 9.

Having described the preferred embodiment of my invention, what I claim and desire to secure by U.S. Letters Patent is:

1. A gear shift mechanism for preventing inadvertent engagement of reverse gear in a multiple speed ratio manual transmission comprising:

a gate plate having a system of interconnected gear shift slots formed therein defining gear ratio positions in the slots;

a gear selector shaft having a selector finger located within and moveable along the slots of the gate plate;

a pawl rotatably mounted on the selector finger defining first and second perpendicular angular positions with respect to the selector finger;

means for rotating the pawl between said angular positions as the selector finger is moved within said slots;

stop means adapted to be contacted by the pawl when the pawl is in the first angular position and the selector finger is moved toward the reverse drive position and to avoid contact with the pawl when the pawl is in the second angular position.

2. The mechanism of claim 1 wherein the pawl includes:

a pin carried on the selector finger directed transverse to the selector finger;

inclined surfaces formed on the surface of the pawl facing the pin, defining between the inclined surfaces grooves directed substantially perpendicular to one another; and a spring urging the inclined surfaces and grooves of the pawl toward the pin.

3. The mechanism of claim 1 further including a control pin located adjacent the slot of the gate plate that contains the reverse gear ratio position for contact by the pawl.

4. The mechanism of claim 2 further including a control pin located adjacent the slot of the gate plate that contains the reverse gear ratio position for contact by the pawl.

5. The mechanism of claim 1 wherein a forward gear ratio position and a reverse gear ratio position are located in a gate plate slot and further including two control pins, one control pin located adjacent said forward gear ratio position, the second control pin located between gate plate slots wherein other forward gear ratio positions are located.

6. The mechanism of claim 2 wherein a forward gear ratio position and a reverse gear ratio position are located in a gate plate slot and further including two control pins, one control pin located adjacent said forward gear ratio position, the second control pin located between gate plate slots wherein other forward gear ratio positions are located.

* * * * *